Sept. 17, 1963     R. H. KLUGE ET AL     3,103,759
FISHING DEVICE
Filed Dec. 13, 1960     2 Sheets-Sheet 1
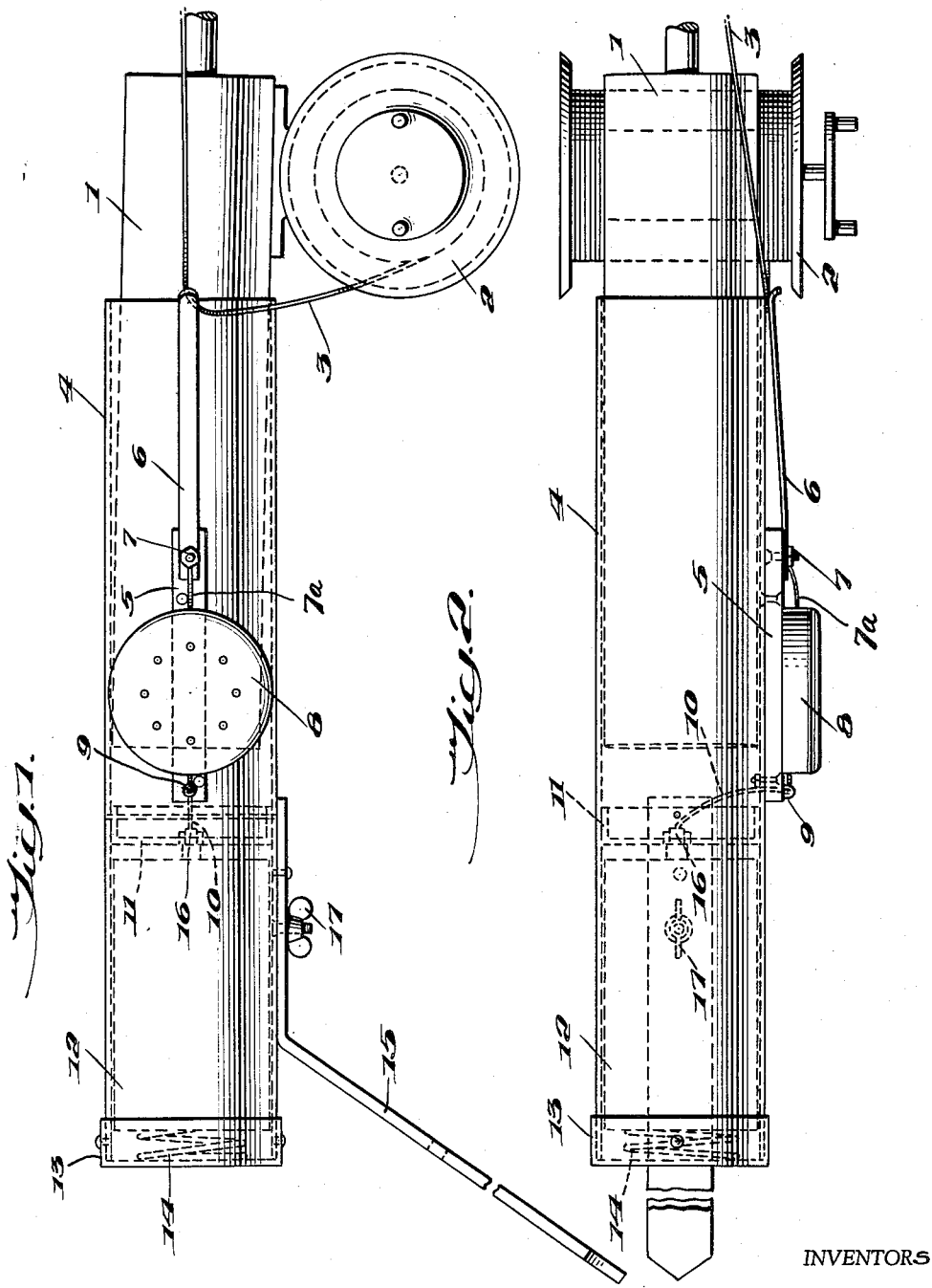
INVENTORS
ROBERT H. KLUGE,
HARVEY MYERS,
BY *Lanoy and Taylor*
ATTORNEYS Sept. 17, 1963
R. H. KLUGE ET AL
3,103,759
FISHING DEVICE
Filed Dec. 13, 1960
2 Sheets-Sheet 2
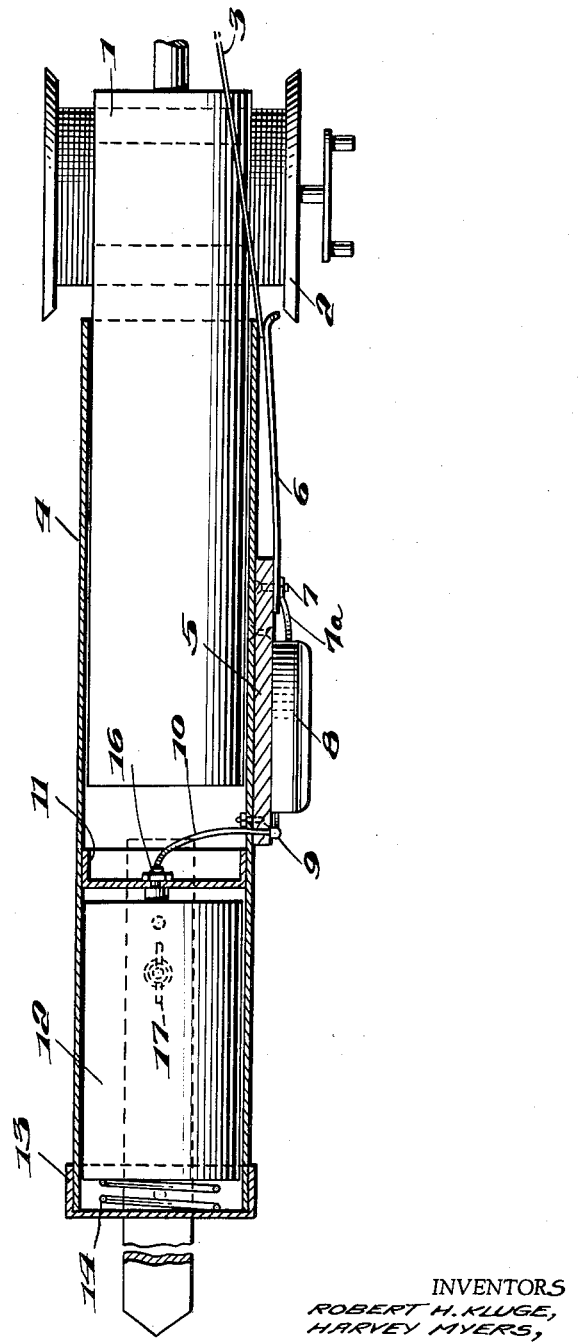
INVENTORS
ROBERT H. KLUGE,
HARVEY MYERS,
BY
*Larson and Taylor*
ATTORNEYS 3,103,759
FISHING DEVICE
Robert H. Kluge, Vassar College, and Harvey Myers,
193 Smith St., both of Poughkeepsie, N.Y.
Filed Dec. 13, 1960, Ser. No. 75,633
2 Claims. (Cl. 43—17)

This invention relates to fishing devices and more particularly to devices for holding a fishing rod and devices for emitting a signal when a fish strikes the line.

There are many devices of this character presently available, some of which both hold the rod as the line is strung out in the water and render a signal when a strike is made at the line. Many of them, however, suffer from bulkiness and complexity and are susceptible to so-called "wind bites" and loss of the prey when the excessive drag or tension they exert on the line causes the fish to "spit the bait" as he tries to run against the tension.

An object of the present invention is to provide a fishing device which will render a signal when a strike is made, but which is not encumbered by the aforementioned disadvantage.

Another object is to provide a fishing device which will hold the rod during the fishing operation as well as render a signal when a strike is made.

A further object is to provide a device of this character which is not subject to "wind bites" and/or loss of the prey because of excessive tension on the line.

Another object is to provide a device of this character having an alarm arrangement which is particularly sensitive to fish strikes on the line.

A still further object is to provide a device of this character which is simple and light in construction, easy to operate, and compact enough to be carried, for example, in one's coat pocket.

Other objects will become apparent upon consideration of the following detailed specification in connection with the accompanying drawings.

Briefly, the invention involves a fishing device in which two electrical contacts are operatively separated by the fishing line so that when the line is withdrawn during a strike, bias on at least one of the contacts will result in their engagement to close an electrical circuit having an associated signal means. The device is so constructed moreover that it engages the line only at this point between the contacts and thus once the line is withdrawn from between them, it is completely free to run out, there being no more restraint on it than that normally provided by the rod and/or reel apparatus with which it is commonly associated. On the other hand, because of this arrangement of contacts, it is possible through adjusting the bias on them to provide such necessary tautness in the line as to prevent its fouling by the wind and current without so-clamping the line as to prevent its quick release when a fish strikes.

In preferred form a holder for the fishing rod defines one of the contacts, the other being mounted on and biased for engagement with the holder when the line is withdrawn.

The holder can comprise a tube adapted at one end to hold the rod and having the contact means at one side of it. The tube need be only the size of a three-cell flashlight and the contact spring mounted at the forward end portion of the tube so as to be the more accessible for the line. Preferably it is mounted adjacent the position commonly taken by the reel when the rod is inserted in the holder tube.

The holder tube can be adapted also to carry a small battery or similar means for providing the charge necessary to actuate the signal when the circuit is closed across the contacts.

Means can be provided on the holder tube moreover for securing it in the ground during the fishing operation or for clamping it on the side of a boat. This securing means preferably is foldable or detachable so as to facilitate carrying the device. It can be re-attachable in a carrying position.

Understandably, any one of a number of electrically actuated signal means, such as buzzers, bells, lights, and the like, can be used in the circuit.

By way of illustrating the invention without limiting its scope, reference should be made to the appended drawings wherein:

FIG. 1 is a side view of the device in preferred form;
FIG. 2 is a top view of the same; and
FIG. 3 is a center sectional view of the device as shown in FIG. 2.

Referring now more specifically to the drawings wherein like numerals indicate like parts throughout the several views there is shown at 1 in FIG. 1 the handle portion of a conventional fishing pole. This fishing pole may be provided with a reel such as shown at 2 having line 3 wound thereon.

According to the present invention a holder is provided for the handle portion of the fishing pole. This holder comprises a tubular member 4 which may be made of electrically conducting material. Mounted on the outer face of tubular member 4 is an insulating block 5 to which is secured by any suitable means a spring contact 6 which is normally biassed into contact with the member 4. As shown, contact 6 is secured by means of a nut and screw bolt 7.

There is also mounted on the insulating block 5 a buzzer 8, which is electrically connected at one terminal to the contact 6 through lead wire 7a and nut and bolt 7. The buzzer 8 at the other terminal is electrically connected through a toggle switch 9 and wire 10 with a central contact 16 mounted in insulating holder 11. A battery 12 has the positive terminal thereof in contact with contact 16 and the negative terminal is electrically connected with casing 4 through end casing 13 and spring 14.

There is provided an angular spike 15 which is secured to the tubular holder 4 by means of wing nut 17. It can be seen that this spike 15 provides a convenient means for retaining the holder supported on the ground as, for example, on the bank of a stream with the fishing pole extending over the water.

The device operates in the following manner. The fishing line is cast in the usual manner and line payed out until the bait is at the desired depth. The fishing pole is then placed in the holder 4 which may be supported on the ground by means of spike 15. The line 3 is placed between the spring element 6 and the tubular member 4. The toggle switch is then placed in the on position. When a fish strikes the line will be pulled from beneath the spring element 6 and the element 6 will be brought into engagement with the casing 4 to close the circuit which will cause the buzzer to sound. The fisherman may remove the fishing pole from the holder and retrieve the fish in the usual way. As can be readily appreciated the presently disclosed signalling device does not impose any extra tension on the line and thus there is no particular danger in losing the fish because of the retention of the line by the spring element 6.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. Apparatus for use with a fishing rod having reel means to reel a fishing line, comprising the combination of an electrically conductive tubular member; an insulat- ing wall intermediately fixed within said tubular member and dividing said tubular member longitudinally into a rod receiving part and an electrical source part, said rod receiving part defining a cylindrically shaped opening for receiving a fishing rod handle and said electrical source part defining a battery receiving compartment; support means attached to the tubular member for independently supporting the apparatus on the ground; an insulated member fixed to the outer wall of said tubular member; signalling means mounted on said insulated member and electrically separated from said tubular member, a resilient electrical contact member having an end attached to the insulated member and electrically separated from said tubular member, the other end of said contact member biased toward the outer end of said rod receiving part, said resilient electrical contact member and the rod receiving part of said tubular member capable of disposing therebetween a bight of fishing line from the rod, thereby operatively separating the contact member and the tubular member; a first terminal mounted centrally of said insulated wall for receiving a battery terminal; a second terminal for receiving another battery terminal and maintaining electrical contact with said tubular member; a first electrical conductor passing through said tubular member and connecting the said first terminal to a terminal of the signalling means; a second electrical conductor connecting the contact member to another terminal of the signal means, thereby completing an electrical circuit for rendering a signal when a fish strikes to withdraw the bight of fishing line from the position operatively separating the contact member and the tubular member.

2. The combination according to claim 1, wherein the first electrical conductor includes switch means to open the circuit after the signal has been rendered.

References Cited in the file of this patent

UNITED STATES PATENTS

| | | |
|---|---|---|
| 2,580,956 | Reddick | Jan. 1, 1952 |
| 2,741,055 | Weber | Apr. 10, 1956 |
| 2,771,703 | Jones | Nov. 27, 1956 |
| 2,986,835 | Ordinetz et al. | June 6, 1961 |